Aug. 14, 1951     H. G. MASER ET AL     2,564,440
MACHINE FOR VIEWING AND PHOTOGRAPHING DOCUMENTS
Filed April 28, 1949     4 Sheets-Sheet 1
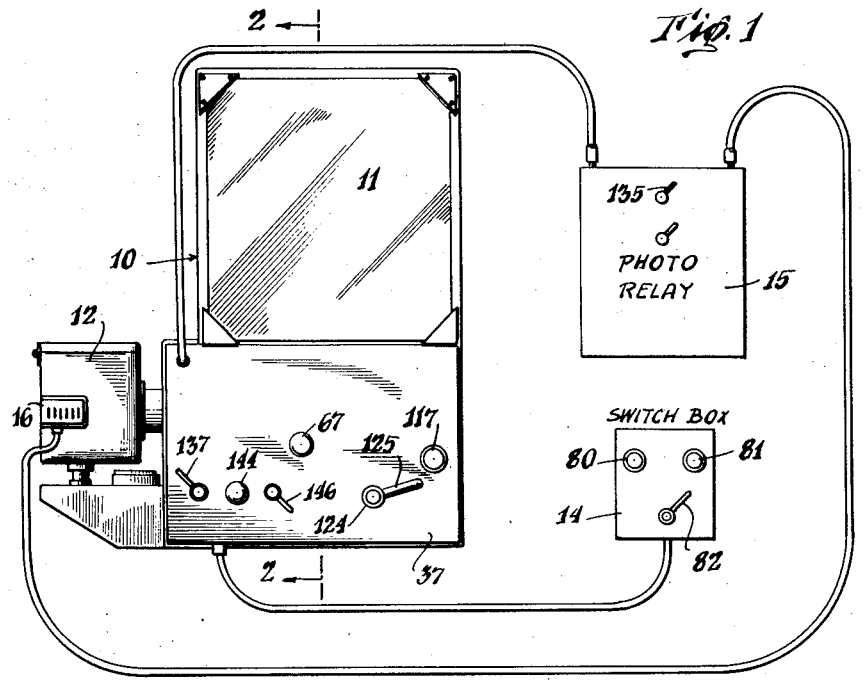
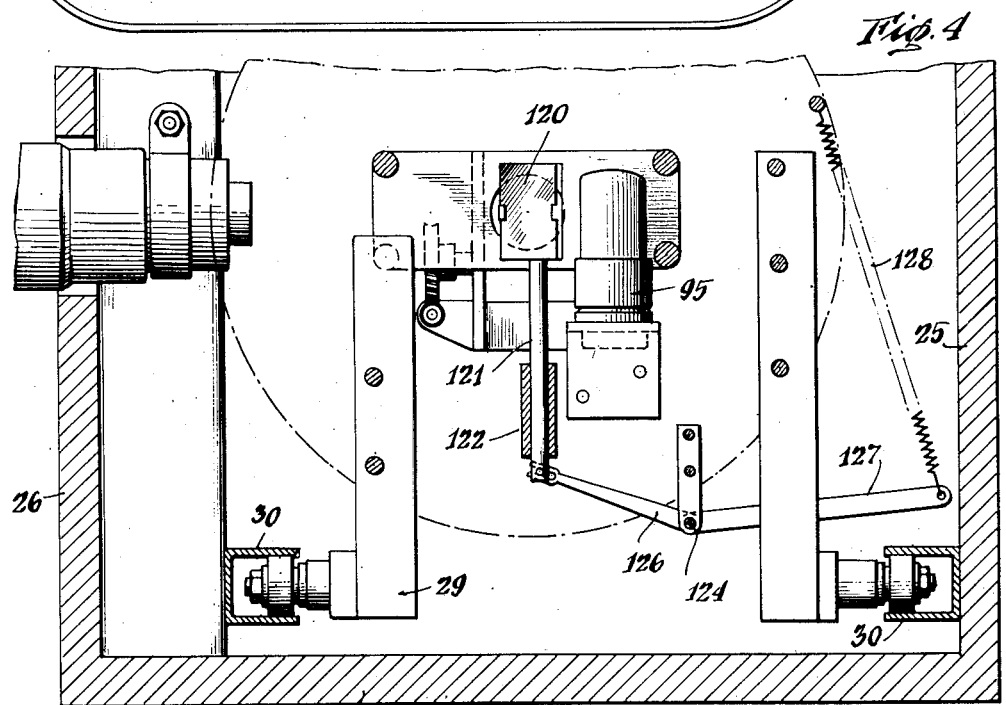
INVENTORS
Herman G. Maser
Ernest P. Taubes
BY
Leo C. Krazinski
ATTORNEY

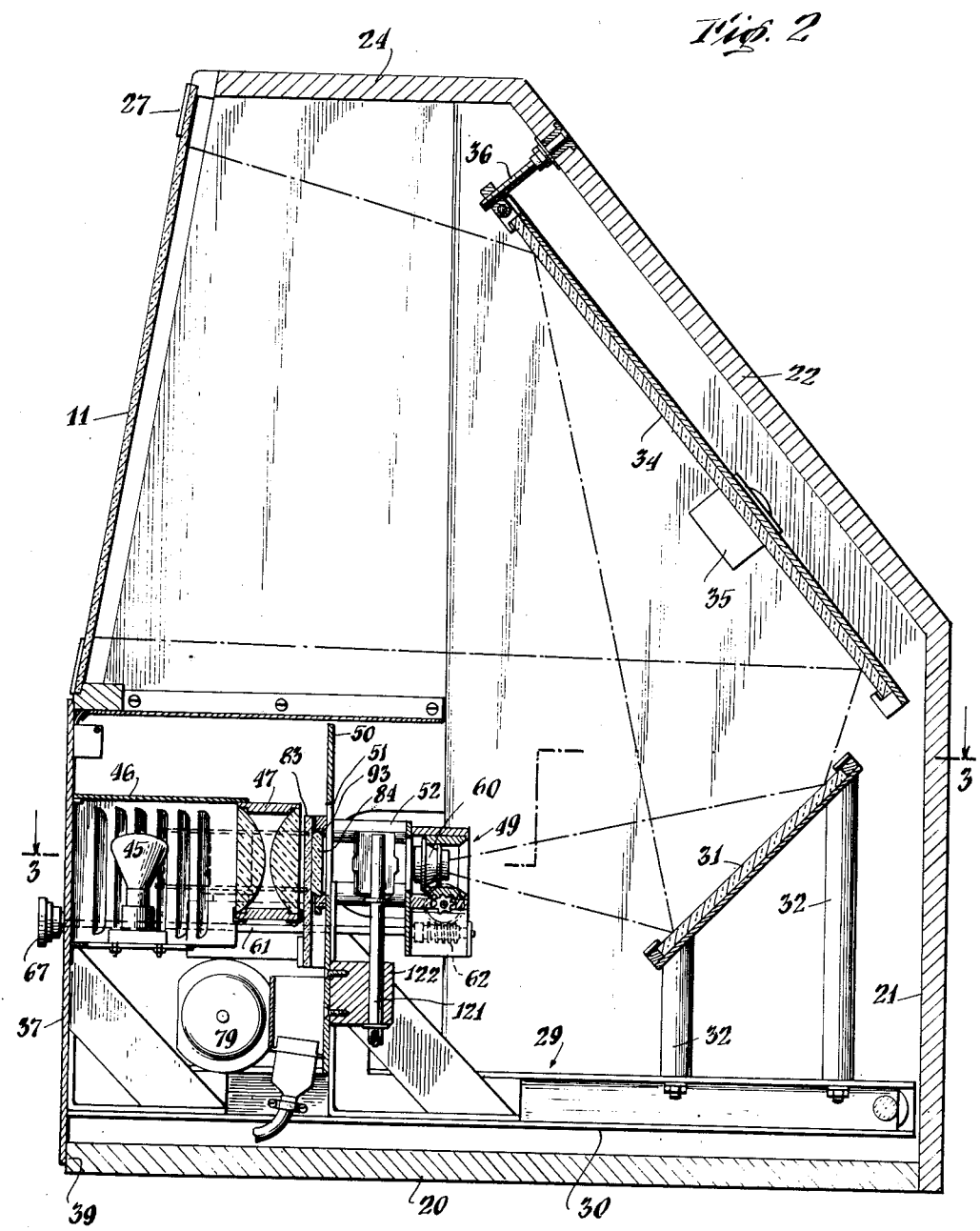

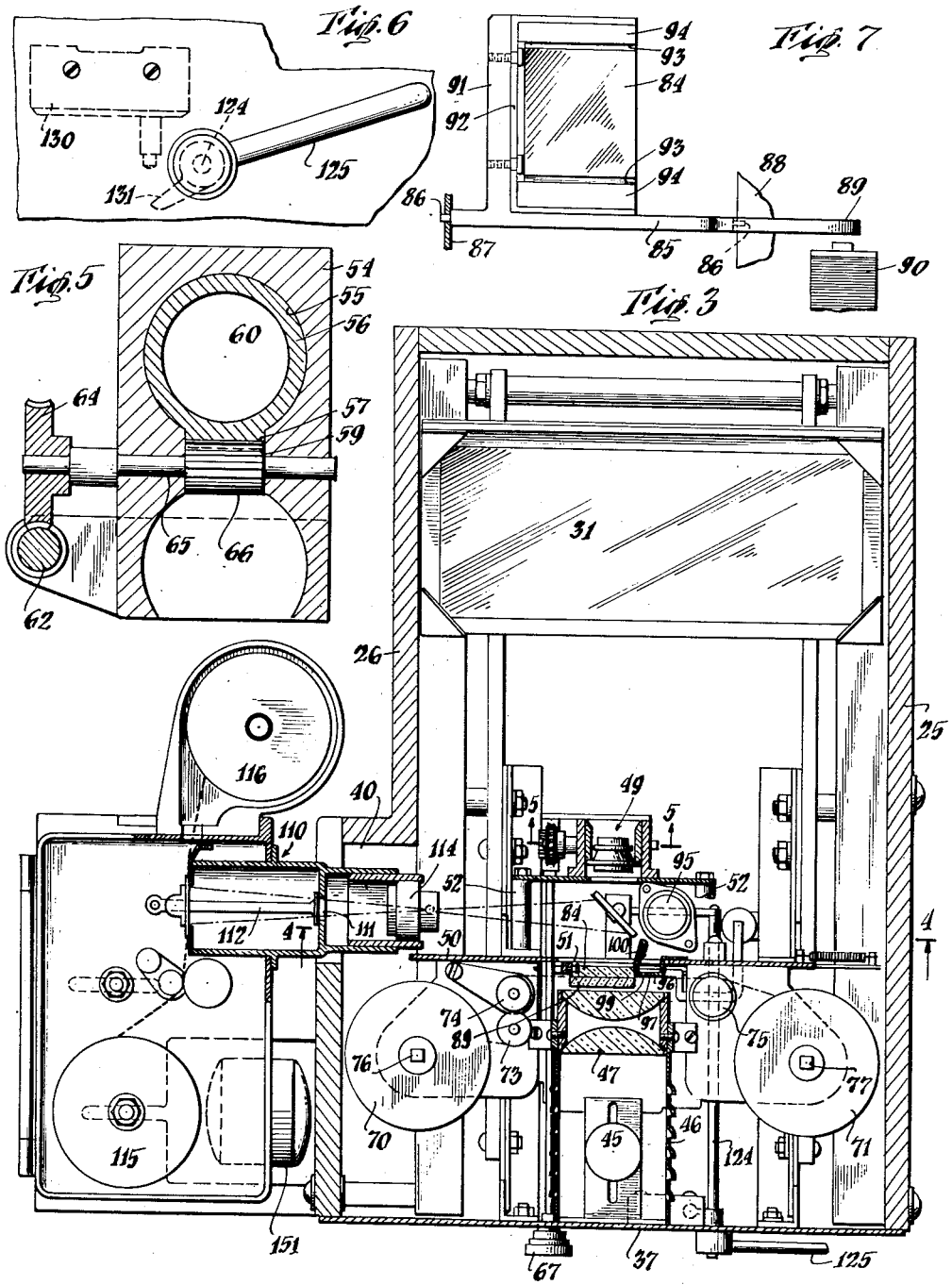

Aug. 14, 1951     H. G. MASER ET AL     2,564,440
MACHINE FOR VIEWING AND PHOTOGRAPHING DOCUMENTS
Filed April 28, 1949     4 Sheets-Sheet 4
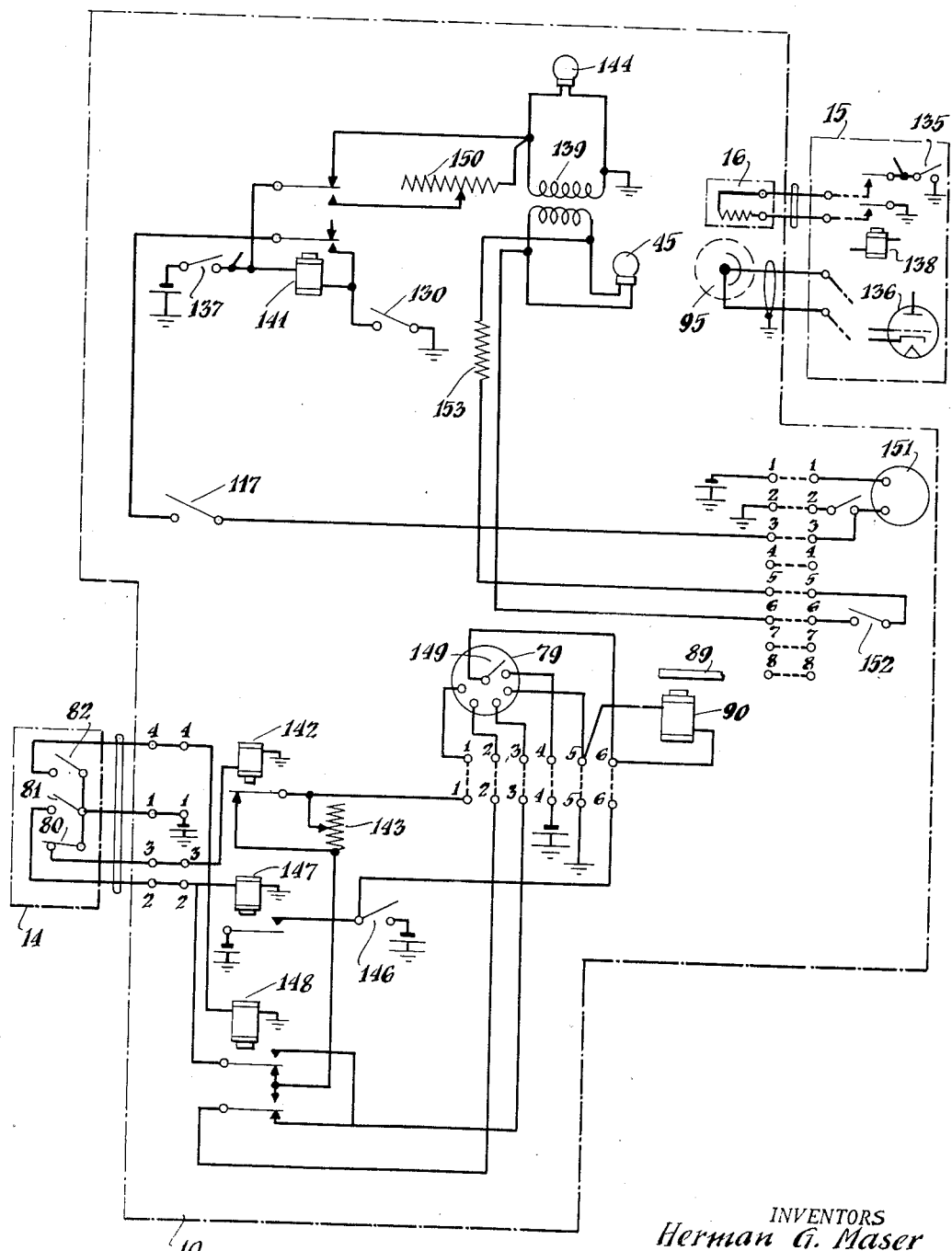
INVENTORS
Herman G. Maser
BY Ernest P. Taubes
Leo C. Krazinski
ATTORNEY Patented Aug. 14, 1951

2,564,440

UNITED STATES PATENT OFFICE 2,564,440

MACHINE FOR VIEWING AND PHOTO-GRAPHING DOCUMENTS

Herman G. Maser and Ernest P. Taubes, New York, N. Y.; said Taubes assignor to said Maser Application April 28, 1949, Serial No. 90,118

2 Claims. (Cl. 88—24)

The present invention relates to photography, and, more particularly, relates to apparatus for viewing a projected image and for reproducing the same.

It has been the practice in recent years to reproduce records of all kinds on microfilm to reduce the storage space required for duplicates of the original records and thereby enable such duplicates to be stored more safely against destruction thereof should the original records be lost, mutilated beyond recognition, or completely destroyed. In carrying out this practice, apparatus has been provided for viewing the microfilm reproductions of the records to eliminate frequent handling of the originals and thereby preserve the same in good condition.

The present invention is more particularly concerned with such viewing apparatus and with the photographic reproduction of the image viewed so that microfilm compilations of desired data can be stored conveniently for review or reproduction in the future.

For example, in searching the chain of title of real estate it is necessary to examine a number of volumes of records containing the deeds in the chain of title and to make copies of these deeds. Both the making of the copies and the subsequent storage thereof involve a considerable expense, particularly to organizations specializing in the searching and guaranteeing of titles. To facilitate these operations, it has been proposed to reproduce such records on microfilm and to maintain a library of such film whereby the examination of the original documents is not required and photographic prints can be made of the desired portions of the records to establish a chain of title.

In furthering this proposal, the present invention aims to provide apparatus which functions to select the frames of reeled film strips on which the desired data is recorded, to project an image thereof on a screen adapted to be viewed by the searcher to determine its pertinence, and to photograph the selected data being viewed, provision being made to compile the selected data in a predetermined order on microfilm from which the data may be printed or again viewed in the future. Such apparatus thereby enables title companies to store the record of a search with a considerable saving of space and to reproduce any desired number of prints of such records at a small cost. Such apparatus also may be used advantageously for many other purposes, for example, in connection with the searching the title to Letters Patent and/or applications for Letters Patent, in the compilation of pertinent cases from law reports to be cited in legal briefs or to be used in argument before the court, and for the analysis of business records.

Accordingly, an object of the present invention is to provide apparatus for accomplishing the foregoing which is simple and economical in construction, is easy to use, and is adapted to reproduce microfilm records at a low cost.

Another object is to provide a combined viewing and reproducing apparatus which facilitates the examination and photographing of microfilm images.

Another object is to provide such apparatus which is readily conditioned for either of its operations by the user.

Another object is to provide such apparatus which is practically automatic in operation and is controlled with a minimum effort by the user.

Another object is to project the image to be viewed and to intercept such image and direct the same to a camera for reproduction.

Another object is to utilize a single light source in the viewing of the image and its reproduction.

Another object is to provide means for varying the intensity of the light source responsive to means for selecting the use of the apparatus for viewing or reproducing the image.

Another object is to provide apparatus of the character described wherein photographic reproduction is accomplished without a dark-room.

Another object is to provide such apparatus wherein the images can be quickly and conveniently selected and positioned for review and reproduction.

Another object is to provide such apparatus wherein adjustment of the camera lens speed, focus, and exposure time is not required for reproducing various images, thereby facilitating rapid operation of the apparatus and eliminating poor reproductions because of errors in judgment in attempting to correlate such variables.

Another object is to provide such apparatus which by reason of its simplicity can be operated by unskilled persons without knowledge of the art of photography.

Another object is to provide such apparatus which is compact in construction and occupies a minimum of space.

Another object is to provide such apparatus wherein the film to be viewed and reproduced can be conveniently inserted and removed without disturbing the fixed predetermined relation between the viewing and reproducing mechanism.

A further object is to provide such apparatus wherein selection of the image is aided by automatic counting means responsive to light from the source and its interruption by the frames of the film strip.

A still further object is to provide apparatus wherein the image selector can be operated in two directions and at different speeds while operated in one of such directions.

Other and further objects will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are generally accomplished by providing apparatus comprising means for viewing an image, such as a screen; means for producing and projecting an image on the screen, preferably including a light source, a condenser lens and a magnifying lens; photographic means for reproducing the image, such as a camera; and means selectively operable, such as a mirror for intercepting the image before it is magnified and projected on the screen and directing the image to the camera. The intensity of the light source is varied in response to the positioning of the mirror to provide a predetermined intensity for projection on the screen and another predetermined intensity for projection into the camera. Take-up and storage reels for the microfilm strip are provided for positioning selected image frames for projection, and drive means are provided for operating these reels at a high and low forward speed and in a reverse direction, the selection of a particular image being facilitated by an electronic counter with a visible indicator and a photocell controlling the counter and responsive to light beam interruptions produced during the movement of the film strip. Preferably, stray light is utilized for effecting operation of the counter to eliminate interfering with the projection of the image. The apparatus is of unitary construction and includes a cabinet for accommodating the projecting and reeling elements in a manner to facilitate loading the film and positioning the elements in predetermined relation to the camera. The lens of the camera faces an opening in this cabinet whereby the cabinet excludes light other than from the light source.

A preferred embodiment of the invention has been chosen for purposes of illustration and description and is shown in the accompanying drawing, forming a part of the specification, wherein:

Figure 1 is a front elevational view schematically illustrating apparatus in accordance with the invention and its operating control means.

Figure 2 is an enlarged sectional view taken along the line 2—2 on Figure 1, illustrating the interior of the apparatus.

Figure 3 is a sectional view taken along the line 3—3 on Figure 2.

Figure 4 is an enlarged sectional view taken along the line 4—4 on Figure 3.

Figure 5 is an enlarged sectional view taken along the line 5—5 on Figure 3, illustrating details of the magnifying lens focusing mechanism.

Figure 6 is an enlarged detail view of switch mechanism for varying the intensity of the light source.

Figure 7 is an enlarged detail view of film strip clamping mechanism embodied in the apparatus.

Figure 8 is a wiring diagram illustrating the electrical circuits and devices utilized to effect operation of the apparatus.

Referring to the drawings in detail and more particularly to Figure 1 thereof, there is shown apparatus for viewing and reproducing microfilm and the like which generally comprises a cabinet 10 for housing film projecting and reeling means together with other elements to be described hereinafter, a screen 11 at the front of the cabinet, a camera 12 at one side of the cabinet with its lens extending into the cabinet, a switch box 14, a control relay box 15, and a visual count indicator 16, the cabinet, and switch and relay boxes having panels for manually operable control elements and pilot lights to which more specific reference will be made in the detailed description of the apparatus about to follow. Electrical conductors operatively interconnect the film reeling and projecting means, the count indicator, the switch box, and the relay box.

*Cabinet*

The cabinet 10 is illustrated more particularly in Figures 2 and 3, and comprises a bottom wall 20, a lower vertical rear wall section 21, an upper rear wall section 22 inclined forwardly, a top wall 24, and side walls 25 and 26 (Figure 3). The upper front section of the cabinet constitutes a rearwardly inclined frame 27 provided with an opening in which the screen 11 is mounted, the screen being of the ground glass type. The lower front section of the cabinet is open for the reception of a drawer structure about to be described.

The drawer structure comprises a suitable frame or chassis 29 conventionally mounted for sliding movement on side rails 30 adjacent the bottom of the cabinet (Figure 2). The chassis serves as a base or support for the film reeling and projecting means, and can be withdrawn from the cabinet to attain access to the film reeling means to facilitate loading thereof, and to make whatever other adjustments, replacements, and repairs of the elements carried on the chassis.

An upwardly facing mirror 31 is supported by bracket members 32 on the back or inner portion of the chassis, and is positioned in the path of the image provided by the projecting means to reflect the same on a downwardly facing mirror 34 supported from the upper rear wall section 22 by a bracket member 35. The mirrors 31 and 34 are at right angles to each other and are positioned to cause the mirror 34 to direct the image on the inner side of the screen whereby the image may be viewed from the outer side of the screen.

In order to relatively position the mirrors 31 and 34 to center the image on the screen, the mirror 34 may be provided with exteriorly operable means 36 at its upper end for adjusting its angle of inclination. In order to properly align the mirrors with respect to each other and to insure such alignment when the apparatus is conditioned for use, the chassis has a front panel 37 secured thereto which engages the front edge of the cabinet bottom at 39 or other stops when the drawer structure is in its inward position, as shown in Figure 2, whereby the mirror 31 is accurately positioned beneath the mirror 34 in a definite predetermined manner.

As shown in Figures 3 and 4, the side wall 26 is formed with an opening 40 into which the camera lens projects, whereby the cabinet 10 in effect serves as a dark-room for the camera. The cabinet is preferably constructed to exclude all external light, and the inner surfaces of the walls thereof may be rendered light absorbing in the usual manner to minimize reflected stray light from interfering with the camera.

Film projecting means

As shown in Figures 2 and 3, the film projecting means comprise a source of light such as a lamp 45 shielded in a ventilated housing 46 secured to the inside of the drawer panel 37, a condenser lens 47 mounted by the housing in front of the lamp, and a magnifying lens assembly 49 supported by a vertical partition 50 on the drawer chassis having an aperture 51 therein for permitting light to pass from the condenser lens to the magnifying lens.

The lens assembly 49 is supported on the partition 50 in axially spaced relation from the aperture 51 by horizontal bracket members 52 to provide a space for the image interceptor to be described hereinafter.

The lens assembly 49 comprises a housing 54 (Figure 5) having an axial bore 55, a sleeve 56 slidably disposed in the bore having a gear rack 57 disposed in a slot or recess 59 extending along the bottom of the bore, and a magnifying lens 60 in the sleeve. In order to move the lens 60 axially to effect focusing, a rotatable shaft 61 (Figure 2) supported at one end by the lens assembly housing, carries a worm 62 for rotating a gear 64 on a shaft 65 which in turn rotates a gear 66 meshing with the gear rack 57. The other end of the shaft 61 is supported by and extends through the drawer panel 37, and a knob or band-wheel 67 is secured to this end of the shaft to facilitate manual rotation of the shaft and focusing from the exterior of the cabinet.

Film reeling means

The film reeling means comprise a storage reel 70, a take-up reel 71, and idler rolls 73, 74, and 75 for positioning the film between the condenser lens 47 and the aperture 51 (Figure 3). The reels 70 and 71 are positioned on and adapted to be rotated by vertical shafts 76 and 77, respectively, which are mounted on the drawer chassis 29 adjacent the respective sides thereof as shown, and which are adapted to be rotated by a motor 79, through conventional drive connections (not shown). The reels are readily accessible to load the film into the apparatus when the drawer has been pulled into an outwardly extending position.

The motor 79 is arranged in a circuit to effect operation thereof at a high and a low speed in a direction to cause the film to be wound on the take-up reel 71, under the control of push button switches 80 and 81, respectively, in the switch box 14 (Figure 1), and to effect high or low speed operation thereof in a reverse direction to cause the film to be wound on the storage reel 70, under the influence of a switch 82 also in the switch box 14. The circuit will be described in detail hereinafter.

The two speeds for unwinding the film from the storage reel make it possible to rapidly get to the approximate portion of the film strip in which the image frame to be viewed is located and then to slowly advance this portion of the strip until the desired frame is positioned between the lens 47 and the aperture 51. Should the desired frame be moved beyond this location, the motor is reversed to bring it back. After the film has been viewed, the motor may be reversed and operated at high speed to rewind the film on the supply reel. Stopping of the motor is effected by releasing the push button switches 80 and 81.

Film clamping means

Interposed between the film reels 70 and 71 (Figs. 2 and 3) there is shown a stationary front plate 83 and a movable rear plate 84, preferably of glass, which plates are normally in abutting engagement with each other and between which plates the film passes from one reel to the other as the movable plate is retracted from such engagement. The stationary plate 83 is rigidly secured to the chassis 29 in any suitable manner (not shown) and the movable plate 84 is fixedly secured to a pivotally mounted bracket. As seen in Figure 7, this bracket includes a horizontally disposed arm 85 in the form of a crank with a pair of spaced pivotal pins 86, rotatably carried in spaced vertical elements 87, 88 secured to the chassis 29, and a free arm or armature 89 disposed over a solenoid 90. A vertical arm 91 extends from the horizontal arm 85 and to this is rigidly secured, as shown, a U shaped frame 92 with angular slots 93 in each of the legs 94 for slidable disposition therein of the glass plate 84, which is provided with similar angularly shaped edges, as is readily apparent in Figure 2. It will thus be seen that upon energization of the solenoid 90, the armature 89 will be attracted thereby to rotate the bracket arm 85 on the pivot pins 86 and accordingly move the plate 84 from abutment with the stationary plate 83. As will appear hereinafter, the solenoid 90 is actuated while the film is being set into position by the attendant and also while the film is being passed from one reel to the other, the clamping position of both plates being used when a particular frame of the film is being photographed.

Film frame counter

The customary practice in microfilm libraries is to provide a subject-matter index which gives the film roll number and the frame number in the roll of each available record. In order to facilitate locating the frame once its number is known, the present invention provides a counter which cooperates with the film reeling means and gives a visible indication of the number of the frame in registry with the image projecting means so that, when the desired frame is located and positioned for viewing, the motor 79 may be stopped.

To accomplish this, the count indicator 16 (Fig. 1) is driven in synchronism with the film reeling means by electronic devices which will be described generally in connection with the electrical circuit for the apparatus.

Since each film frame is separated by a border having a different light transmission than the image itself, the present invention proposes to take advantage of this border to effect actuation of the count indicating means by utilizing each border to advance the counter one unit.

The means for accomplishing the foregoing comprise a photoelectric cell 95 in the counter circuit which is supported by the magnifying lens assembly 49 (Figure 3) and is located at one side of the partition aperture 51 but out of the path of the image being projected. A bracket 96 is secured to the partition 50 at one side of the aperture which has a plate portion 97 facing the film strip between the upper and lower edges thereof. A narrow slot 99 is formed in the plate portion through which a small stray beam of light from the light source may pass.

This beam of light is directed on a mirror 100 at the end of the bracket and the mirror reflects the same to the photoelectric cell 95. Each time a vertical film frame border passes across the slot, the beam is interrupted due to the opaqueness of the border whereby the photoelectric cell responds to effect actuation of the counter.

The camera

The camera, as shown in Figure 3, comprises a film exposing box 110, an opening 111 for admitting light therethrough, a shutter 112 normally closing the opening and operable to unclose the opening for a short interval of time, a lens 114 in front of the opening for projecting images on the film, and film supplying and positioning means including a film supply reel 115 and an exposed film take-up reel 116. Preferably, the opening 111 has a fixed predetermined area, the shutter speed is constant, and the lens 114, once focussed, is fixed whereby when the film is exposed to an image having a substantially constant light intensity and coming from a fixed point, uniform photographic reproductions will be obtained. This eliminates errors of judgment in adjusting the shutter speed, the area of the opening, and the focussing of the lens.

Conventional mechanism (not shown) may be utilized for advancing the camera film through the camera box in a step-wise manner, such mechanism including a push button 117 on the panel 37 (Figure 1) which is arranged in the electrical circuit to be described.

The camera lens is in the same plane as the image projecting beam, but is at right angles thereto for the purpose about to be made apparent.

Image intercepting means

The image intercepting means, as shown in Figures 2, 3, and 4, includes a mirror 120 adapted to be selectively interposed in the path of the projected image to direct the same to the camera. The mirror is positioned at an angle of forty-five degrees, both with respect to the axis of projection and the axis of the camera lens, and is mounted on a vertical rod 121 which is slidably disposed in a bearing block 122 secured to the partition 50.

Mechanism is provided for raising and lowering the mirror 120 so that it may be positioned out of the path of the projected image in order to view the image on the screen, and so that it may be positioned to intercept the image and direct the same to the camera (Figure 3). Such mechanism comprises a rotatable shaft 124 having one end extending outwardly through the panel 37, a manually operable handle 125 (Figure 1) on the end of the shaft, and a lever 126 mounted for rotation with the shaft having its free end connected to the lower end of the rod 121. A second lever 127 is mounted on the shaft 124 and a spring 128 has one end connected to the free end of this lever and has its other end connected to the partition 50 to normally urge the shaft in a counter-clockwise direction, as viewed in Figure 4, to cause the lever 126 to hold the rod 121 downwardly with the mirror 120 out of the path of the image. When it is desired to intercept the image, the handle 125 is operated to rotate the shaft 121 in a clockwise direction to cause the lever 126 to raise the rod 121 to the position illustrated.

It is desirable to reduce the intensity of the lamp 45 when the image is directed to the camera. To accomplish this, as shown in Figure 6, a switch 130 is adapted to be operated by an arm 131 on the shaft 124 while the mirror 120 is raised into its image intercepting position to connect a resistance into the lamp circuit, as will be described in connection with Figure 8.

Referring now to Figure 1 and Figure 8, the operation of the apparatus of this invention will be described, particularly by tracing through the various electric circuits, as each becomes effective. To simplify the circuit illustration the usual battery symbol is utilized as indicating the alternating current source. In first setting up the apparatus the power switch 135 (toggle) in the photoelectric relay cabinet 15 is closed to permit the vacuum tube 136 therein to warm up and then the main power switch 137 in the cabinet 10 is turned on.

At this point it may be mentioned briefly that the photoelectric relay circuit partially shown herein is of conventional type, such as unit No. CR7505-N110 manufactured by the General Electric Company, the primary elements comprising the phototube 95 in the cabinet 10, and an amplifying vacuum tube 136 and relay 138 in the photoelectric relay cabinet 15. The function thereof is such that, when the beam of light emitted by lamp 45 is changed, the relay 138 is deenergized to cause the counter 16 to register such change. Operation of the photoelectric relay switch 135 also supplies energy to the armatures of the photoelectric relay.

Upon operation of the main power switch 137 energy is supplied to a transformer 139 through the upper back contact of relay 141, also to the winding of a relay 142 through the normally closed switch 80 in the control box 14, which relay 142 operates and opens the break contact thereof, thus including a resistance 143 in the motor circuit for driving the film, as will be discussed more fully hereinafter. The circuit for relay 142 may be traced from ground through the winding thereof, terminals 3 of a plug and socket connection in cabinet 10, and thence via a four-conductor cable to switch box 14, where the circuit continues through normally closed contacts of switch 80, after which it returns via the cable to terminals 1 in the main cabinet and thence to the source of energy. It is, of course, understood that upon actuation of power switch 137 all other sources of electromotive force shown are rendered effective. The lamp 45, which is connected to the secondary winding of the transformer 139, is energized to serve as a source of light for the screen as well for the photoelectric tube 95, and a 110-volt 6-watt lamp 144 also is illuminated as a power-on indicator.

The next step is to arrange the film in position on the reels and before doing this a solenoid switch 146 is operated to its closed position. This switch connects energy to the solenoid 90, which upon actuating, as explained hereinbefore, separates the movable glass plate 84 (see Fig. 3) from the stationary glass plate 83 and thus permits the film to be disposed therebetween by the attendant. The circuit for the solenoid 90 may be traced from the source of supply through the closed solenoid switch 146, thence through terminals 6 of a six-wire plug and socket connection, through the solenoid 90, and thence through terminals 5 of the plug and socket to ground. After the film is placed in position, the solenoid switch 146 is returned to its normally open position and the above solenoid circuit in response thereto opens to restore the plates 83, 84 to their film clamping condition.

The film having been installed, the next step involves operating the push button 81 in the switch box 14, so as to pass the frames of the film from the supply reel to the take-up reel, which frames are also projected upon the screen 11 in the hereinbefore described manner. The circuit effectuated by operation of this button may be traced from the supply source through terminals 1, over 4-wire cable, through closed contacts of push button 81, back over 4-wire cable, through terminals 2, and thence along two paths, one path through the winding of relay 147 to ground and the other path through the upper back contact of relay 148 through resistance 143, which is inserted in the circuit in view of the operation of relay 142, and thence through terminals 1 of a plug and socket connection to the motor 79. Relay 147 operates and connects a source of energy through its make contact to the solenoid 90, which operates in a similar circuit already described. The motor 79 rotates at a predetermined low rate of speed because of the voltage drop brought about by the resistance 143 and, to increase the speed of the film travel, the push button 80 in the switch box 14 is operated to its open position. Operation of button 80 removes energy from relay 142, which accordingly releases and through retraction of its break contact shunts the resistance 143 to connect the full source of energy directly to the motor, which operates now at a higher rate of speed.

When the light from lamp 45 falls upon the photoelectric lamp 95, the photoelectric relay 138 is energized to close its make contacts and supply a source of energy to the counter 16, the circuit for which is readily evident. However, the border of each frame of the film, as it passes the aperture 97 (Fig. 3) is adapted to change the beam of light and, for every such change, relay 138 is deenergized with the resultant opening of its make contacts and release of the counter 16, which completes its cycle by registering quantitatively said changes. Thus for each film frame the counter is actuated once, so that it gives a ready indication of the number of frames passed, the counter, of course, being set to zero initially.

When the attendant observes on the counter that his desired frame number is approaching, he releases one of the push buttons, namely button 80, which reoperates relay 142 to slow down the rate of travel of the film in the manner already mentioned. Push button 81 is then released a predetermined time in advance of the desired film frame's appearance on the screen and accordingly, relay 147 releases and the motor 79 coasts to a stop. In order to prevent the clamping mechanism from seizing and stopping the film while the motor is coasting, and also the reels with which it is mechanically coupled, a centrifugally controlled switch contact 149, mounted on the rotor of the motor, is serially interposed in a parallel circuit for the solenoid 90 to maintain the latter energized until the rotational speed of the motor drops to a predetermined point, after which the switch 149 opens and permits the solenoid to release. This parallel circuit may be traced from a source of energy through terminals 4 of the plug and socket connection, centrifugal switch 149, terminal 6, thence through solenoid 90 and terminals 5 to ground. Should the motor carry the film beyond the desired frame, the film travel can be reversed by operation of the reversing toggle switch 82, which circuit will be described hereinafter.

However, assuming that the particular frame is in the correct position for photographing purposes, the handle 125 is rotated clockwise, as viewed in Figure 1, to interpose the mirror 120 in the path of the projected image so as to direct the same to the camera, the mechanism therefor being already described. When the handle 125 reaches its extreme operated position, the arm 131 (see Fig. 6) thereon closes the switch 130. Closure of this switch operates relay 141 (Fig. 8) in a circuit that can be traced from ground, through switch 130, winding of relay 141, and thence to a source of energy. Relay 141 in operating, at its upper armature transfers the source of supply from the break contact to the make contact and inserts a resistance 150 in series with the primary winding of the transformer 139, thereby reducing the voltage thereof and the intensity of the lamp 45 for a purpose already described; and at its lower make contact a circuit is prepared for the camera motor 151.

The printing push button switch 117 is next operated to operate the shutter 112 and expose the film in the camera a predetermined period of time to the desired frame. The motor circuit therefor may be traced from ground through closed switch 130, lower make contact of relay 141, closed switch 117, and thence through terminals 3 of a plug and socket connection to the camera motor 151, a source of energy being supplied thereto through terminals 1. The motor 151 passes the film in the camera one frame and prepares the camera film for a succeeding exposure. As many exposures as desired may be made of the particular frame by so operating the printing switch 117 and additional succeeding frames of the film, if desired, may be printed by repeating the above procedure.

To rewind the film on its storage reel 70 the reversing switch 82 is operated to close an energizing circuit for the reversing relay 148. This circuit may be traced from a source of energy through terminals 1, over 4-conductor cable, through closed switch 82, back over the 4-conductor cable, through terminals 4, and thence through the winding of relay 148 to ground. Relay 148 in operating, at its upper and lower armatures reverses the connections to the motor 79. Both switches 80 and 81 are then operated, the former opening the circuit of relay 142 and the latter supplying energy to the motor 79. The rewinding circuit may then be traced from a source of energy through terminals 1, over 4-wire cable, closed switch 81, back over 4-wire cable through terminals 2, and thence in two paths, one path through the winding of relay 147 which operates in a manner already described to energize the solenoid 90; and the other path through upper make contact of relay 148, and thence through terminals 3 of plug and socket connection to motor 79. Operation of relay 148 also interconnects terminals 1 and 2 of the plug and socket connection to the motor 79 through the lower make contact thereof. The motor 79 drives the film from the take-up reel to the supply reel and upon the film being fully rewound thereon the switches 80, 81, and 82 are restored to their normal positions. The hereinbefore procedure is repeated with other films for succeeding exposures and it is to be noted that the camera will be adapted to print the various frames of the various films in a sequential order, so that the series of negatives produced by the camera will give a complete story of the chain of title or other desired information. It is to be noted further that when the film in the camera approaches exhaustion a switch 152 is closed by a conventional lever mechanism to energize an obvious circuit for a warning buzzer 153.

From the foregoing description, it will be seen that the present invention provides a novel and highly useful image viewing and reproducing apparatus. The apparatus is simple and compact in design, can be economically constructed, and can be easily operated even by unskilled persons. The apparatus is practically automatic in operation, and can stand such rough usage to which it normally may be subjected.

As various changes may be made in the form construction and arrangement of the parts herein, without departing from the spirit and scope of the invention and without sacrificing any of its advantages, it is to be understood that all matters are to be interpreted as illustrative and not in any limiting sense.

What is claimed is:

1. In apparatus of the class described, the combination of a screen for viewing an image, a projector including means for providing an image and a source of light of a predetermined intensity for projecting the image on said screen, a camera including a fixed focus and fixed speed lens and a fixed time shutter, a mirror adapted to be interposed in the path of the image adjacent said image providing means to direct the image to said camera, and means responsive to interposition of said mirror in the path of said image for varying the intensity of said light source to a predetermined value correlated with lens speed and shutter time to provide for proper exposure of the film in said camera.

2. In apparatus of the class described, the combination of a screen for viewing an image, a projector including means for providing an image and a source of light of a predetermined intensity for projecting the image on said screen, a camera including a fixed focus and fixed speed lens and a fixed time shutter, a mirror adapted to be interposed in the path of the image adjacent said image providing means to direct the image to said camera, and means responsive to interposition of said mirror in the path of said image for reducing the intensity of said light source to a predetermined lower value correlated with lens speed and shutter time to provide for proper exposure of the film in said camera.

HERMAN G. MASER.
ERNEST P. TAUBES.

REFERENCES CITED

The following references are of record in the file of this patent:

UNITED STATES PATENTS

| Number | Name | Date |
| --- | --- | --- |
| 1,819,883 | Fleischer | Aug. 18, 1931 |
| 1,834,218 | MacDonald | Dec. 1, 1931 |
| 1,838,389 | Goldberg | Dec. 29, 1931 |
| 2,121,061 | Townsend | June 21, 1938 |
| 2,122,710 | Bidwell | July 5, 1938 |
| 2,168,190 | Busse | Aug. 1, 1939 |
| 2,249,228 | Rogers | July 15, 1941 |
| 2,332,810 | Place | Oct. 26, 1943 |
| 2,372,910 | Pratt | Apr. 3, 1945 |
| 2,432,704 | Warman | Dec. 16, 1947 |
| 2,435,099 | Pratt | Jan. 27, 1948 |